United States Patent
Shinohara et al.

(10) Patent No.: US 12,415,462 B2
(45) Date of Patent: Sep. 16, 2025

(54) DISPLAY SWITCHING DEVICE, VEHICLE DISPLAY SYSTEM AND AUTOMOBILE

(71) Applicant: OMRON Corporation, Kyoto (JP)

(72) Inventors: Masayuki Shinohara, Kyoto (JP); Yuto Mori, Kyoto (JP); Gouo Kurata, Kyoto (JP); Masao Mishina, Kyoto (JP); Yutaka Okayasu, Kyoto (JP)

(73) Assignee: OMRON Corporation, Kyoto (JP)

( * ) Notice: Subject to any disclaimer, the term of this patent is extended or adjusted under 35 U.S.C. 154(b) by 156 days.

(21) Appl. No.: 18/461,498

(22) Filed: Sep. 5, 2023

(65) Prior Publication Data
US 2024/0131997 A1    Apr. 25, 2024

(30) Foreign Application Priority Data
Oct. 17, 2022   (JP) ................. 2022-166388

(51) Int. Cl.
*B60R 11/02* (2006.01)
*G02F 1/1335* (2006.01)
*G02F 1/1343* (2006.01)

(52) U.S. Cl.
CPC ...... *B60R 11/0235* (2013.01); *B60R 11/0264* (2013.01); *G02F 1/133504* (2013.01); *G02F 1/133526* (2013.01); *G02F 1/133607* (2021.01); *G02F 1/134345* (2021.01)

(58) Field of Classification Search
CPC ............ B60R 11/0235; G02F 1/133607
See application file for complete search history.

(56) References Cited

U.S. PATENT DOCUMENTS

| | | | |
|---|---|---|---|
| 7,755,263 B2* | 7/2010 | Park ................. | H01J 11/44 |
| | | | 313/111 |
| 7,821,185 B2* | 10/2010 | Park ................. | G02B 5/003 |
| | | | 428/690 |
| 7,995,166 B2* | 8/2011 | Uehara ............. | G02F 1/133526 |
| | | | 349/95 |
| 8,446,355 B2* | 5/2013 | Uehara ............. | H04N 13/398 |
| | | | 345/204 |
| 9,778,472 B2* | 10/2017 | Wei .................. | G02B 3/00 |
| 10,036,941 B2* | 7/2018 | Takahashi ........ | B60K 35/232 |
| 11,412,596 B2* | 8/2022 | Shinohara ........ | G09G 3/20 |
| 2004/0169831 A1* | 9/2004 | Uehara ............. | G02F 1/133526 |
| | | | 348/E13.028 |

(Continued)

FOREIGN PATENT DOCUMENTS

JP    2003084681    3/2003

Primary Examiner — Irfan Habib
(74) Attorney, Agent, or Firm — JCIPRNET

(57) ABSTRACT

A display switching device (1) includes: a lens array (40); a display part (10), comprising pixel regions (31) disposed to include regions in which light in which respective light emitted from light sources (50) is condensed by respective lenses (41) of the lens array (40) passes through. A transmittance of each pixel region (31) is set corresponding to a predetermined stationary pattern. Display of the display part (10) performed through irradiation of the light of the light sources (50) exhibits directivity, and a first averaged oriented direction (D1) averaging, among the light sources (50), oriented directions as directions of the directivity is inclined at a predetermined angle with respect to a normal direction of a display surface (11) of the display part (10).

9 Claims, 10 Drawing Sheets

(56) References Cited

U.S. PATENT DOCUMENTS

| | | | |
|---|---|---|---|
| 2009/0052164 A1* | 2/2009 | Kashiwagi | H04N 13/32 |
| | | | 362/97.2 |
| 2009/0086466 A1* | 4/2009 | Sugita | G02F 1/133615 |
| | | | 362/97.1 |
| 2013/0242402 A1* | 9/2013 | Konig | G02B 27/0101 |
| | | | 359/630 |
| 2014/0022619 A1* | 1/2014 | Woodgate | G02B 27/0093 |
| | | | 359/240 |
| 2015/0029442 A1* | 1/2015 | Koike | G02B 5/045 |
| | | | 349/65 |
| 2016/0053961 A1* | 2/2016 | Akutsu | F21S 43/14 |
| | | | 362/521 |
| 2017/0343826 A1* | 11/2017 | De Zwart | G02B 30/27 |
| 2018/0329122 A1* | 11/2018 | Goto | G02B 27/0172 |
| 2023/0099347 A1* | 3/2023 | Matsumura | B60Q 3/62 |
| | | | 362/488 |

* cited by examiner (a)

(b)

DISPLAY SWITCHING DEVICE, VEHICLE DISPLAY SYSTEM AND AUTOMOBILE

CROSS-REFERENCE TO RELATED APPLICATION

This application claims the priority benefit of Japan application serial No. 2022-166388, filed on Oct. 17, 2022. The entirety of the above-mentioned patent application is hereby incorporated by reference herein and made a part of this specification.

BACKGROUND

Technical Field

The disclosure relates to a display switching device, a vehicle display system, and an automobile.

Description of Related Art

As an example, Patent Document 1 discloses a vehicle-mounted display device having directivity in a specific direction. The vehicle-mounted display device is a liquid crystal display device including a liquid crystal panel. The vehicle-mounted display device exhibits directivity in the luminance distribution and the viewing angle by using a prism sheet that refracts light from a backlight as the light source of the liquid crystal panel and polarization plates provided in front of and behind the liquid crystal panel.

PRIOR ART DOCUMENT(S)

Patent Document(s)

[Patent Document 1] Japanese Laid-open No. 2003-84681

However, in the vehicle-mounted display device of Patent Document 1, the light from the backlight is emitted into the liquid crystal panel via a light guide plate, a light reflection member, a downward prism sheet, a diffusion sheet, an upward prism sheet, a light control film, and a polarization plate. That is, in the liquid crystal display, an image is displayed on the liquid crystal panel by using light of a light source traveling through multiple components. In addition, in a liquid crystal system, since only light of a specific polarization component is used for display, the light usage efficiency is not favorable. Therefore, the luminance of the liquid crystal panel is insufficient. In particular, under sunlight during daytime, it is difficult to see the image displayed on the liquid crystal panel.

An aspect of the disclosure provides a display switching device having an increased usage efficiency of the light emitted from the light source, and exhibiting directivity in a display direction.

SUMMARY

A display switching device according to an aspect of the disclosure switches display images by switching irradiation of light from a plurality of light sources. The display switching device includes: a lens array, in which a plurality of lenses are arranged; and a display part, including a plurality of pixel regions disposed to include regions in which light in which the respective light emitted from the light sources is condensed by the respective lenses of the lens array passes through. A transmittance of each of the pixel regions is set corresponding to a predetermined stationary pattern, and display of the display part performed through the irradiation of the light of the light sources exhibits directivity, and an averaged oriented direction averaging, among the light sources, oriented directions that are directions of the directivity is inclined at a predetermined angle with respect to a normal direction of a display surface of the display part.

Figure 2:
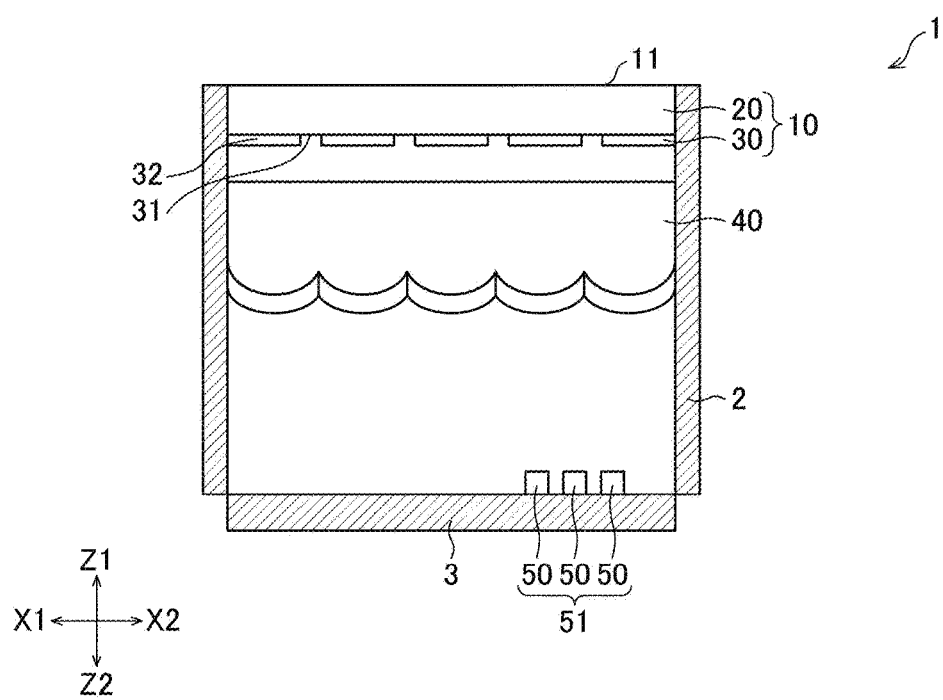
FIG. 2 is a schematic view illustrating a basic configuration of a display switching device according to Embodiment 1 of the disclosure.
Figure 3:
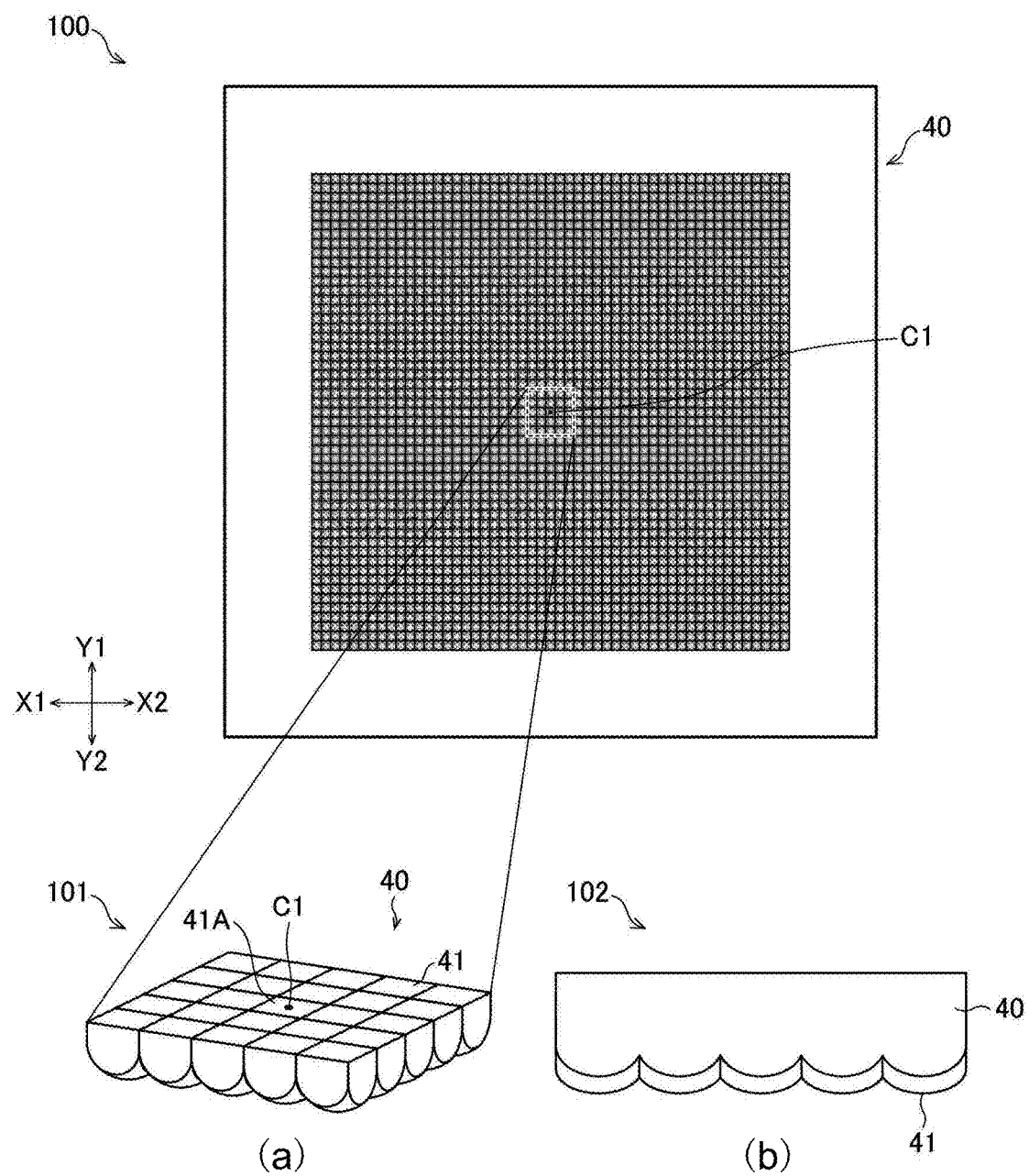

(*a*) and (*b*) of FIG. 3 are views illustrating an example of a configuration of a lens array shown in FIG. 2.

Figure 4:
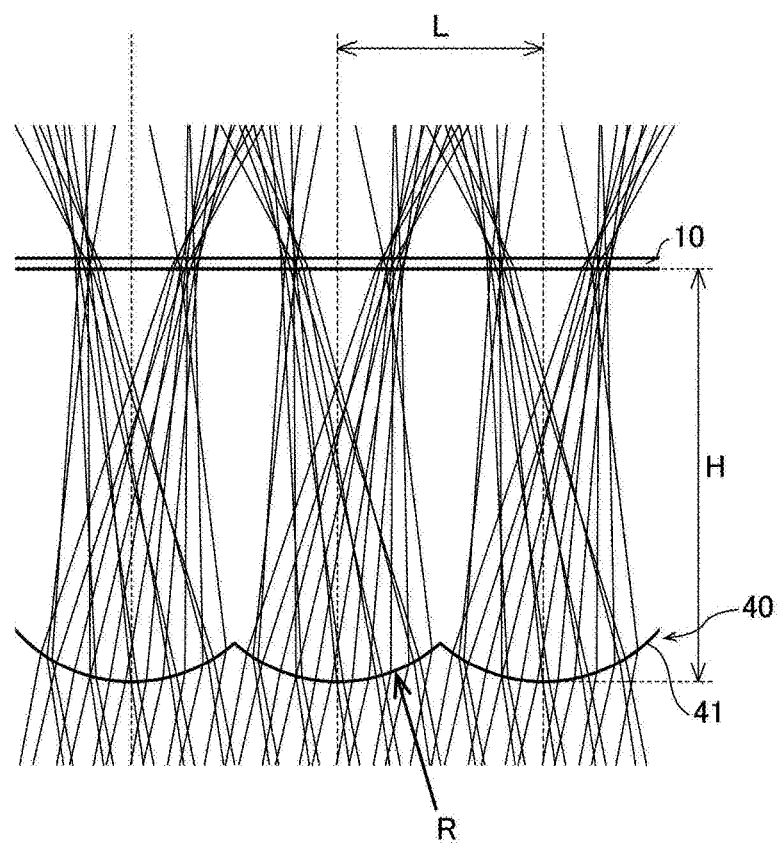

FIG. 4 is a view illustrating an example of a state of light condensation by using the lens array.

Figure 5:
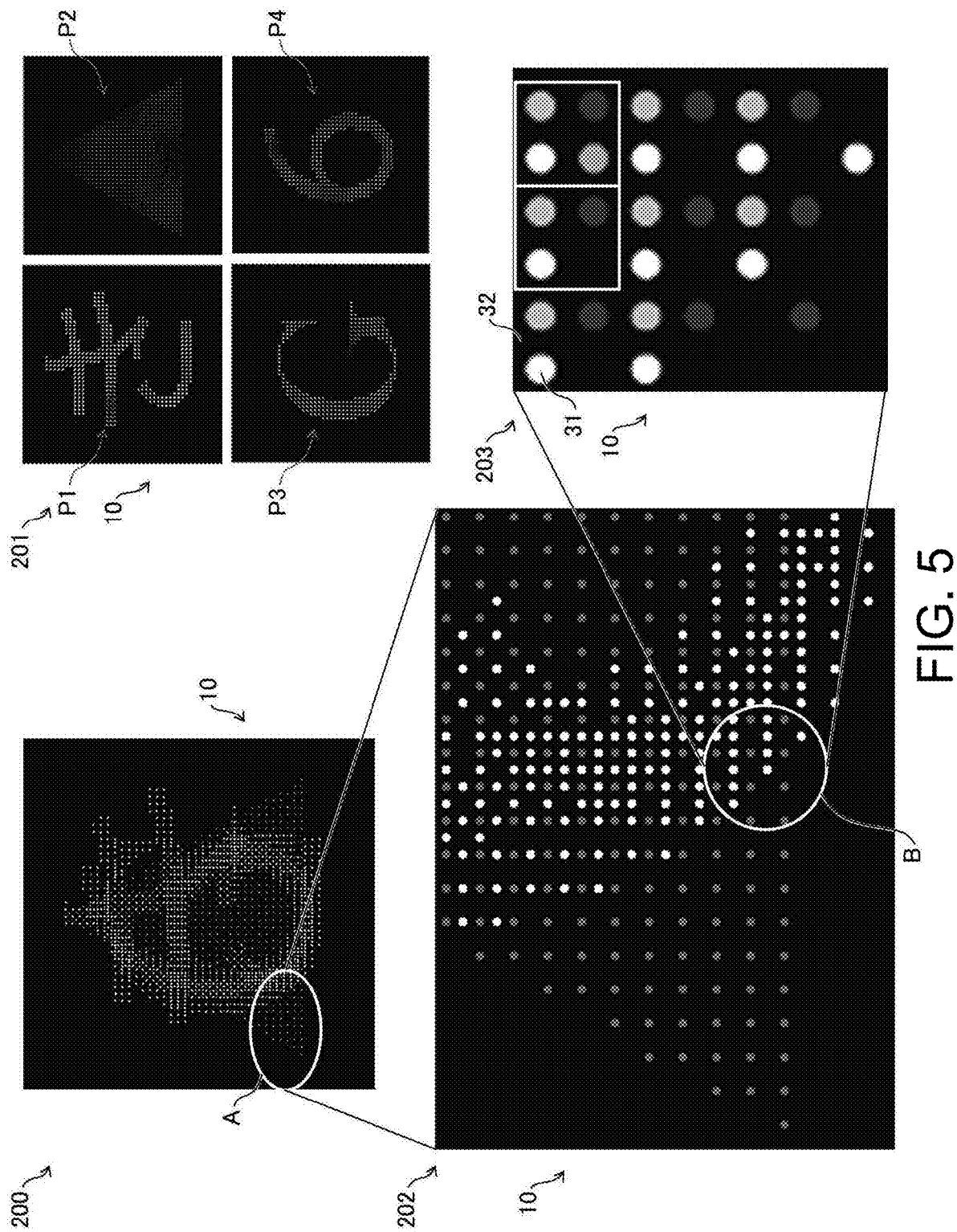

FIG. 5 is a view illustrating an example of switching display of a display part.

Figure 6:
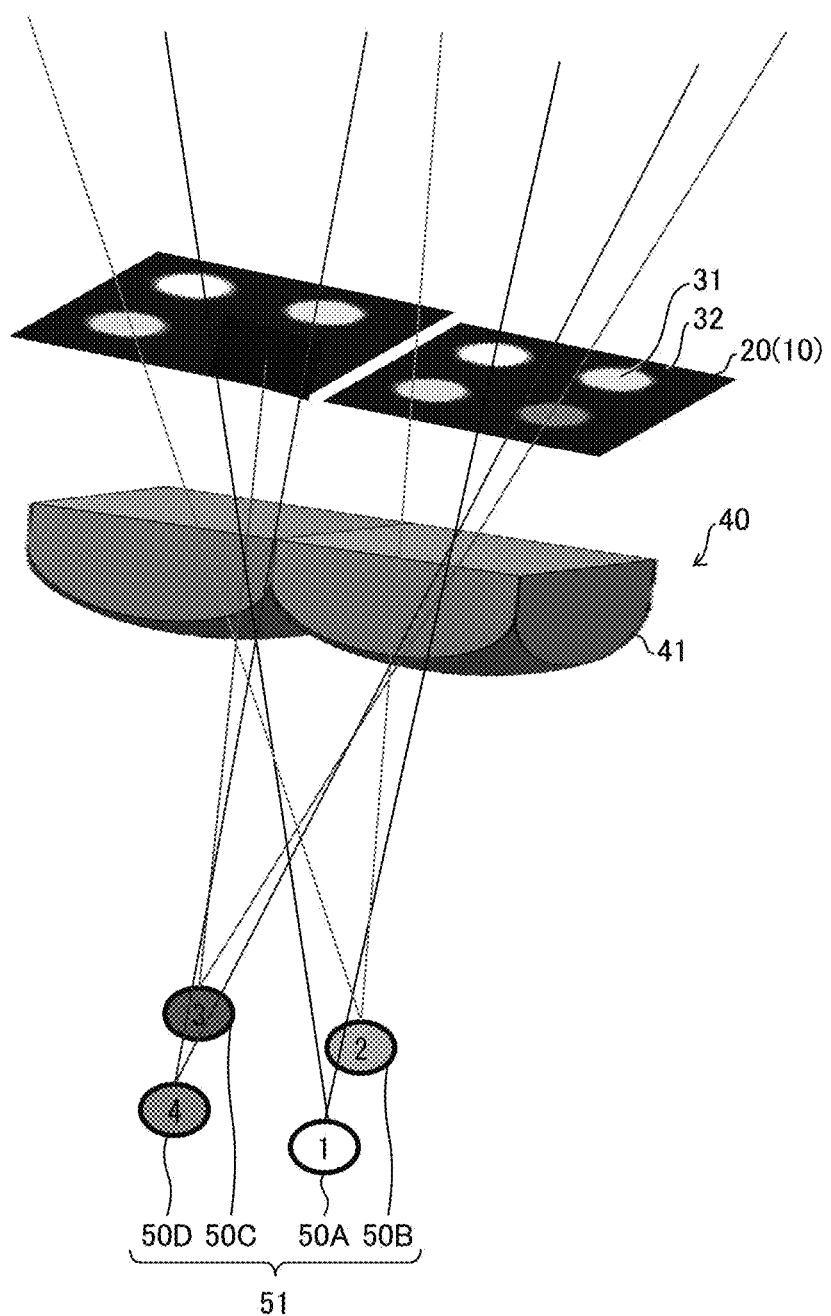

FIG. 6 is a view illustrating a corresponding relationship among the display part, lenses forming the lens array and the respective light sources forming a first light source group.

Figure 7:
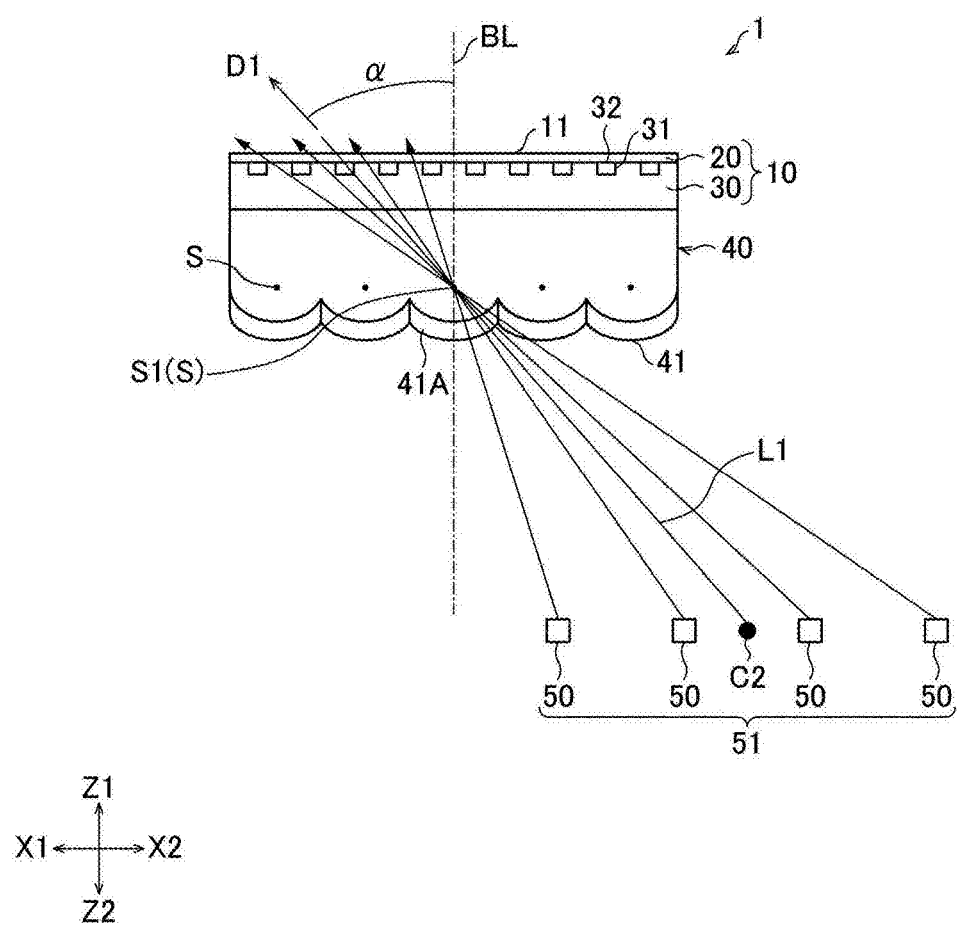

FIG. 7 is a view illustrating a position relationship of the first light source group with respect to the display part and the lens array.

Figure 8:
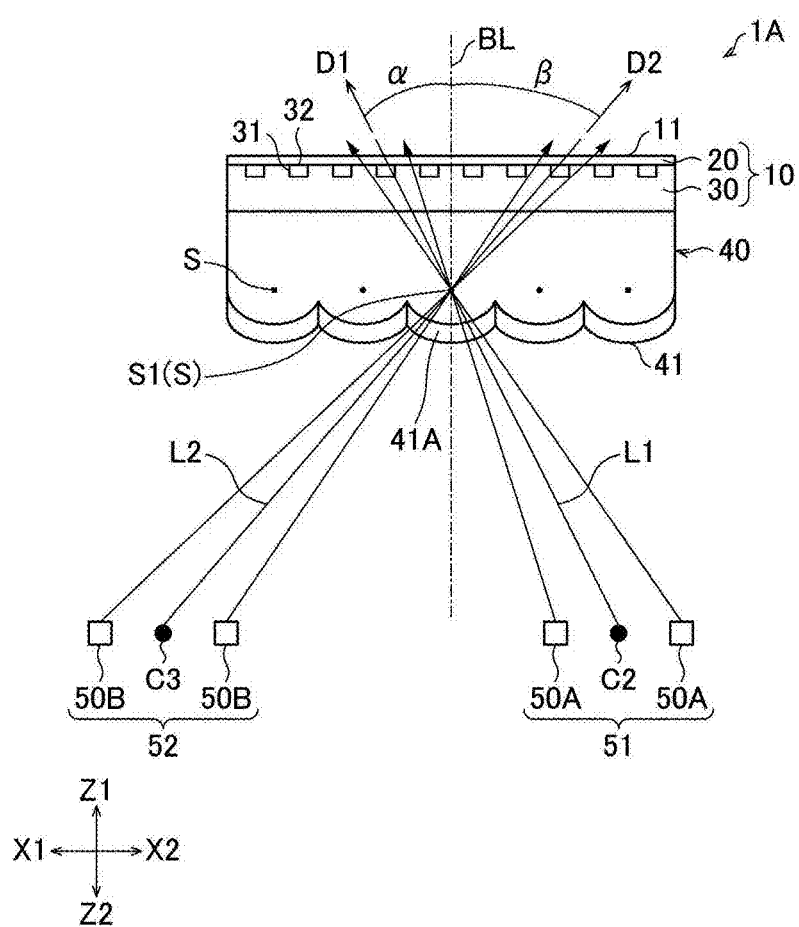

FIG. 8 is a view illustrating main parts of a configuration a display switching device according to a modified example of Embodiment 1.

Figure 9:
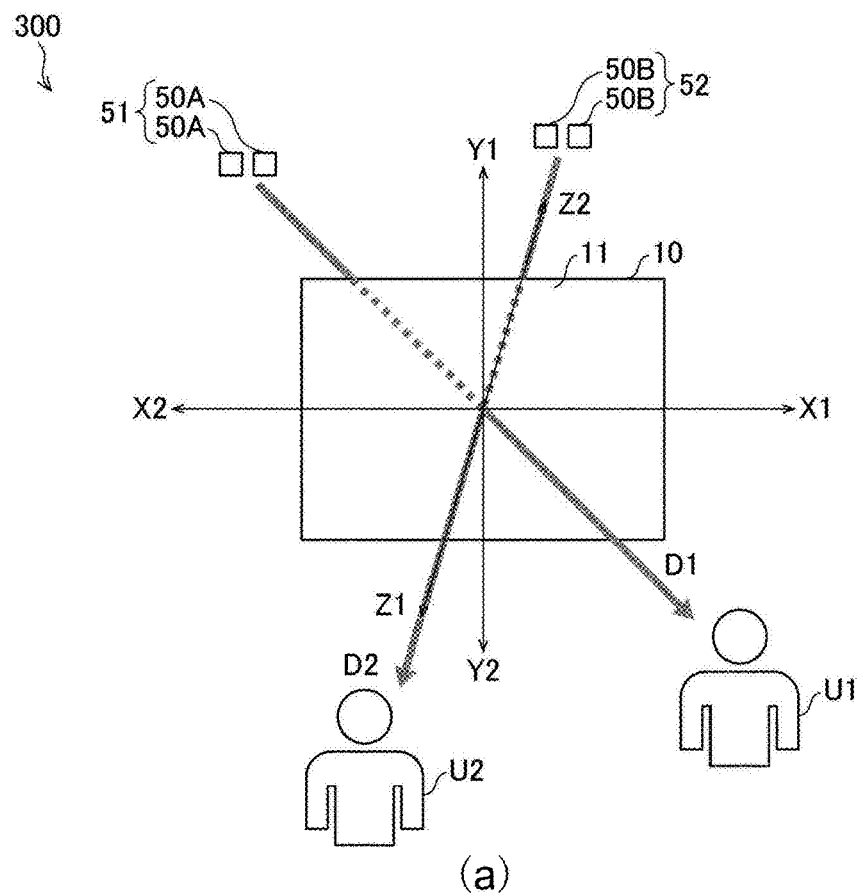
Figure 9:
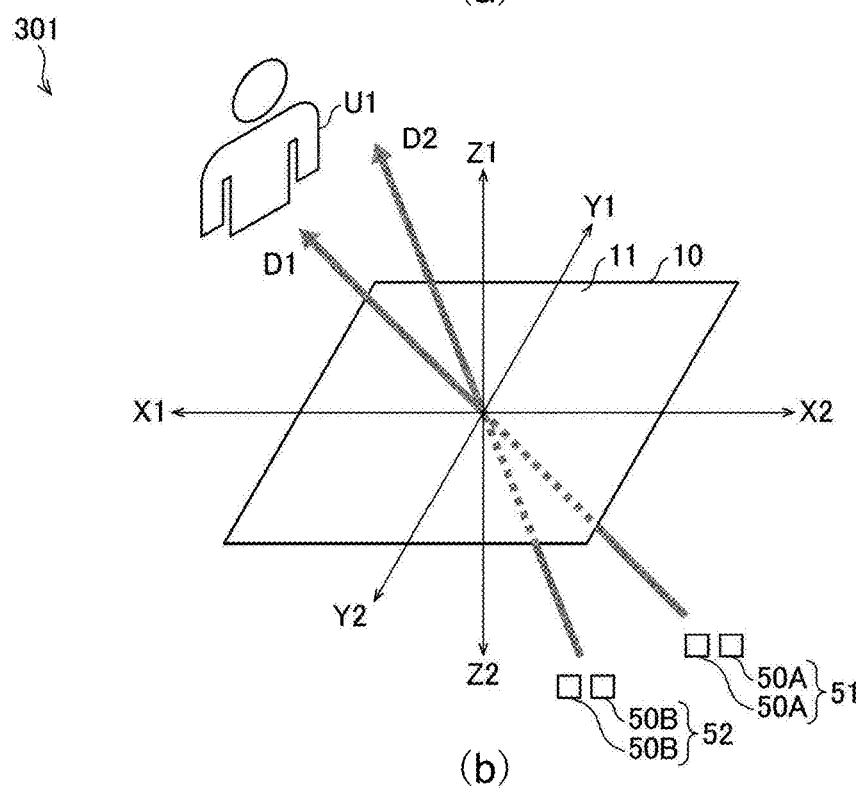

(*a*) and (*b*) of FIG. 9 are views illustrating relationships between averaged oriented directions and users able to visually recognize an image in a case where the averaged oriented direction is arranged as two directions different from each other.

Figure 10:
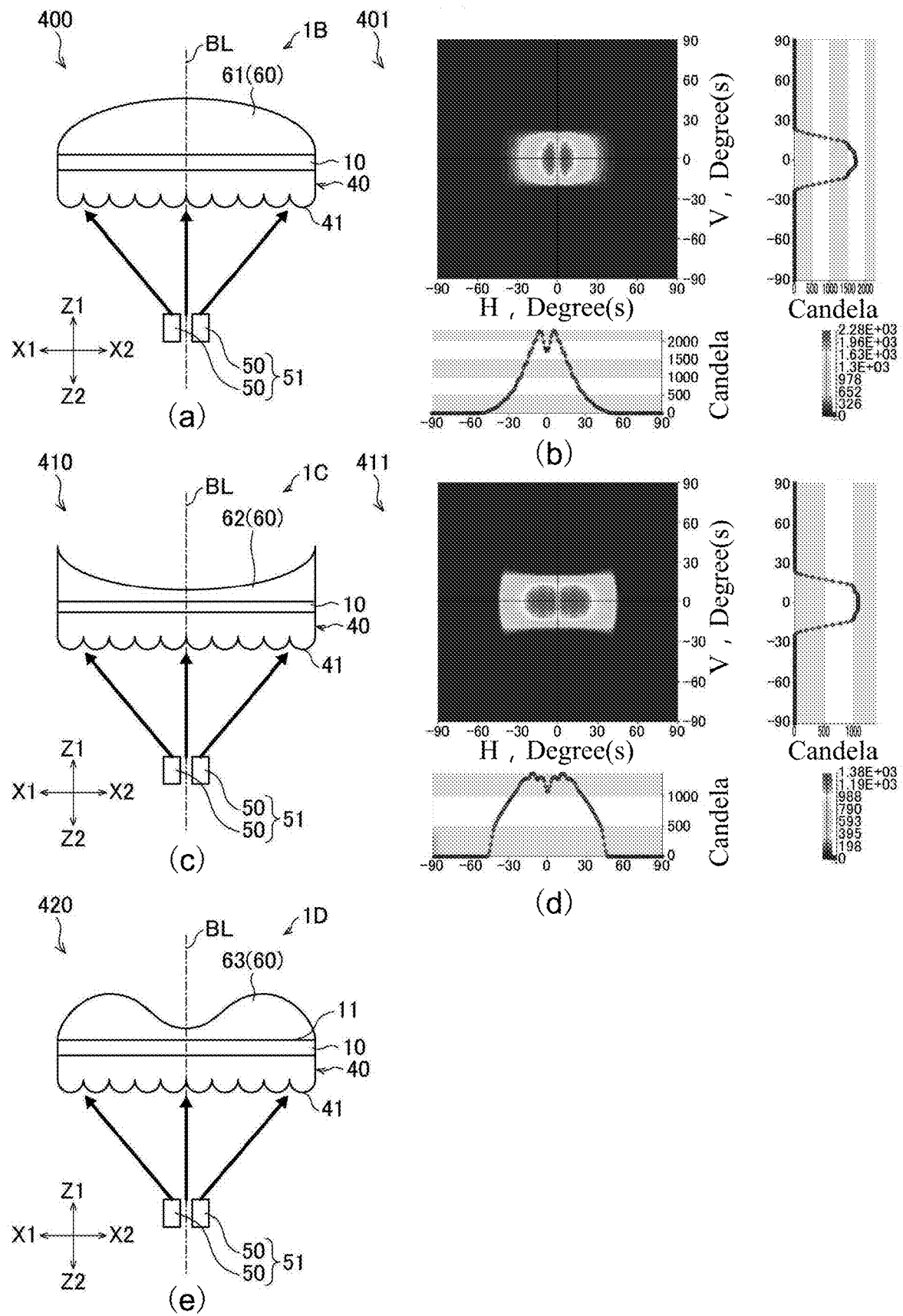

(*a*) to (*e*) of FIG. 10 are views illustrating display switching devices according to modified examples of Embodiment 1.

Figure 11:
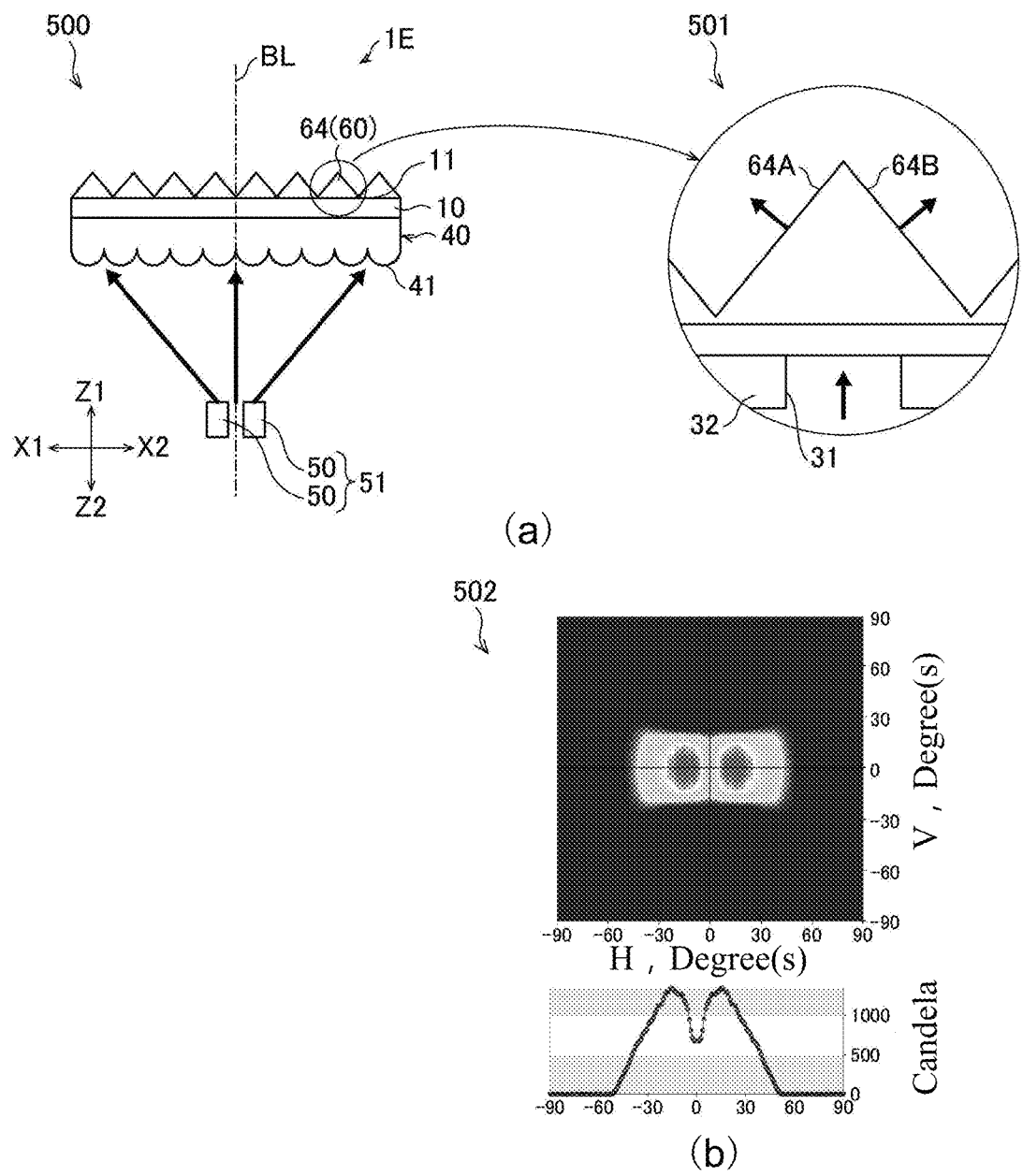

(*a*) and (*b*) of FIG. 11 are views illustrating a display switching device according to a modified example of Embodiment 1.

DESCRIPTION OF THE EMBODIMENTS

A display switching device according to an aspect of the disclosure switches display images by switching irradiation of light from a plurality of light sources. The display switching device includes: a lens array, in which a plurality of lenses are arranged; and a display part, including a plurality of pixel regions disposed to include regions in which light in which the respective light emitted from the light sources is condensed by the respective lenses of the lens array passes through. A transmittance of each of the pixel regions is set corresponding to a predetermined stationary pattern, and display of the display part performed through the irradiation of the light of the light sources exhibits directivity, and an averaged oriented direction averaging, among the light sources, oriented directions that are directions of the directivity is inclined at a predetermined angle with respect to a normal direction of a display surface of the display part.

According to the configuration, since display is performed through the light condensed by the respective lenses of the lens array, the display using the display part exhibits directivity of a certain extent. In addition, the averaged oriented direction averaging the oriented directions of the display of the display part performed through irradiation of the light from the respective light sources is inclined at the predetermined angle with respect to the normal direction of the display surface. That is, according to the configuration, display exhibiting directivity in a biased direction that is not the front surface with respect to the display surface of the display part can be realized. At this time, compared with the configuration using light of a specific polarization component, as in the conventional liquid crystal display device, for example, the usage efficiency of the light emitted from the light source can be higher. In addition, the cost can be lower than the liquid crystal display device.

In the display switching device, it may also be that the lens located at a closest position with respect to a gravity center of the lens array is set as a reference lens, and a direction of a line segment connecting a main point of the reference lens and a gravity center position of a first light source group formed by a plurality of light sources of the light sources is inclined with respect to the normal direction of the display surface.

According to the configuration, by shifting the gravity center position of the first light source group with respect to the gravity center position of the lens array, an angle can be set for the incident angle of the light from the first light source group with respect to the lens array. Therefore, the direction averaging the directions in which the light of the first light source group condensed by the respective lenses of the lens array passes through can be inclined with respect to the normal direction of the display surface of the display part. Accordingly, by disposing the pixel regions of the display part in the regions in which the light of the first light source group condensed by the respective lenses of the lens array passes through, display images having directivity in a first direction can be displayed on the display part.

In the display switching device, it may also be that the display switching device further includes an optical member having a function of refracting light emitted from the display surface in a direction inclined with respect to the normal direction of the display surface, diffracting the light emitted from the display surface in the direction inclined with respect to the normal direction of the display surface, or combining the refracting and the diffracting.

According to the configuration, the light condensed by the respective lenses of the lens array is refracted and/or diffracted by the optical member, so as to be inclined with respect to the normal direction of the display surface. Accordingly, the display switching device having display directivity can be provided by using a simple configuration.

In the display switching device, it may also be that the optical member is a lens.

In the display switching device, it may also be that the optical member is a prism.

In the display switching device, it may also be that the averaged oriented direction is arranged as two directions different from each other.

According to the configuration, display exhibiting directivity in two directions can be realized. Accordingly, display that can be visually recognized at positions of two users can be carried out.

In the display switching device, it may also be that display in accordance with a first averaged oriented direction is realized through light from a first light source group formed by a plurality of light sources of the light sources, and a second averaged oriented direction is realized through light from a second light source group formed by a plurality of light sources of the light sources and disposed at a position different from that of the first light source group.

According to the configuration, the display switching device in which the first averaged oriented direction according to the light from the first light source group and the second averaged oriented direction according to the light from the second light source group are different can be realized.

In the display switching device, it may also be that the display switching device further includes an optical member having a function of refracting the light emitted from the display surface in two directions different from each other, diffracting the light emitted from the display surface in two directions different from each other, or combining the refracting and the diffracting.

According to the configuration, a display switching device in which the averaged oriented direction is arranged as two directions different from each other can be provided by using the optical member.

IA vehicle display system according to another aspect of the disclosure is configured to include the display switching device according to any one of the above aspects, and the display switching device is provided in a state in which the averaged oriented direction is oriented toward an assumed seated position where a passenger is assumed to be seated in a vehicle.

According to the configuration, a vehicle display system in which directivity is set in the display direction in accordance with the position of the passenger can be provided.

In the vehicle display system, it may also be that the display switching device is provided in a shift lever provided in the vehicle.

An automobile according to an aspect of the disclosure may be configured to be provided with the vehicle display system according to any of the above aspects.

According to an aspect of the disclosure, a display switching device having an increased usage efficiency of the light emitted from a light source, and exhibiting directivity in a display direction can be provided.

Embodiment 1

The display switching device of the disclosure is a display device having directivity in a display direction. In the embodiment, a display switching device 1 as an aspect of the display switching device of the disclosure is described.

1. Application Example

Figure 1:
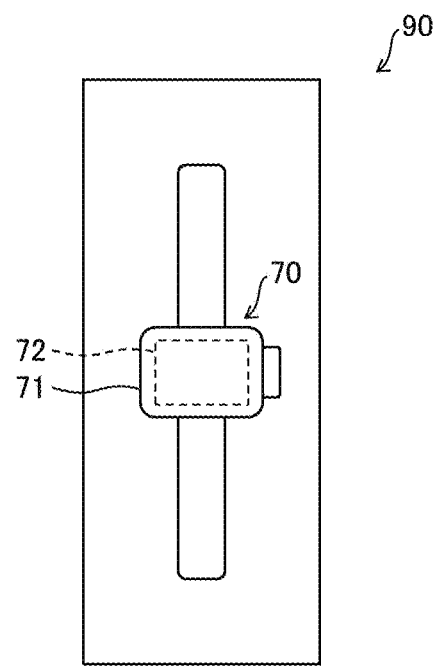
FIG. 1 is a view illustrating a shift lever including a display switching device.

Firstly, referring to FIG. 1, an example of a scenario where the display switching device is applied is described. FIG. 1 is a view illustrating a shift lever 70 including the display switching device 1. The display switching device 1 is provided in a vehicle display system 90 disposed in an automobile. In the embodiment, the vehicle display system 90 is disposed in the shift lever 70 included in the automobile.

As shown in FIG. 1, an image display part 72 is disposed on the upper surface of a grip part 71 of the shift lever 70. An image in accordance with the operation on the shift lever 70 by the driver is displayed on the image display part 72. On the image display part 72, images respectively illustrating the respective transmission modes of the engine of the vehicle are displayed in accordance with the operation on the shift lever 70. On the image display part 72, letters indicating "P (Parking)", "R (Reverse)", "N (Neutral)", and "D (Drive)" are displayed, for example.

The image displayed on the image display part 72 exhibits display directivity toward an assumed seated position where a passenger (user) is assumed to be seated in the vehicle. According to the configuration, a vehicle display system in which directivity is set in the display direction in accordance with the position of the passenger can be provided. The image display part 72 is realized by using the display switching device described in detail in the following.

2. Configuration Example

In the following, the configuration of the display switching device 1 according to the embodiment is described in detail based on FIGS. 2 to 7. In the following description, the configuration relating to the display switching device of the disclosure is described by defining a coordinate system of three directions, namely X (X1-X2) direction (left-right direction), Y (Y1-Y2) direction (upper-lower direction), and Z (Z1-Z2) direction (front-rear direction) as shown in FIG. 2, etc.

(Basic Configuration of the Display Switching Device)

FIG. 2 is a schematic view illustrating a basic configuration of the display switching device 1 according to the embodiment. As shown in FIG. 2, the display switching device 1 includes a display part 10, and a microlens array (briefly referred to as lens array in the following) 40. In addition, the display switching device 1 may further include a first light source group 51, and a substrate 3 to which the first light source group 51 is installed.

The display part 10 and the lens array 40 are supported by a housing 2. In addition, in the embodiment, the basic configuration of the display switching device 1 is formed by installing the housing 2 to the substrate 3 to which the first light source group 51 is installed.

The display switching device 1 may also include a protection layer for preventing damages above (Z1 side) of the display part 10. In addition, the display switching device 1 may also include a light modulation member above the display part 10. As the light modulation member, example may include a smoked member, a half minor, a polarization plate, a color plate, a diffusion plate, a member displaying a display image, and a smoked member combined with a diffusion plate to provide a diffusion function, etc. In addition, a member blocking a portion of the viewing angle of the display part 10 may also be provided above the display part 10. Examples of the member blocking a portion of the viewing angle include a louver, etc. The size of each of the above components may be designed as appropriate in accordance with the size of the image display part 72.

The first light source group 51 is formed by multiple light sources 50 emitting light toward the lens array 40. The light sources 50 may be respectively configured to emit light of the same color, and may also be respectively configured to emit light of different colors. Examples of the light sources 50 include RGBLEDs.

The configuration of the lens array 40 is described with reference to (*a*) and (*b*) of FIG. 3. (*a*) and (*b*) of FIG. 3 are views illustrating an example of a configuration of the lens array 40 shown in FIG. 2. A symbol 100 in (*a*) of FIG. 3 represents a view in which the lens array 40 shown in FIG. 2 is observed from Z1 direction. A symbol 101 in (*a*) of FIG. 3 represents a perspective view of the lens array 40 in which a portion of the view of the symbol 100 surrounded by a dot line is enlarged and shown. A view represented by a symbol 102 in (*b*) of FIG. 3 is a partial cross-sectional view in which a portion of the lens array 40 is enlarged and shown.

As shown by the views represented by the symbols 100 to 102 in (*a*) and (*b*) of FIG. 3, the lens array 40 is formed by arranging multiple lenses 41 into a two-dimensional matrix. The respective lenses 41 of the lens array 40 condense the light emitted from the light sources 50 of the first light source group 51.

FIG. 4 is a view illustrating an example of a state of light condensation by using the lens array 40. According to FIG. 4, it is understood that, by changing the position of the light source 50, the light condensation location can be changed.

As indicated by the symbols 100 and 101 in (*a*) of FIG. 3, the center position of the region in which the lenses 41 are arranged into a two-dimensional matrix is a gravity center position C1 of the lens array 40. The following description is made by adopting the lens 41 located at a position closest to the gravity center position C1 as a reference lens 41A.

The display part 10 is formed by an image layer 20 and a matrix layer 30, and displays an image P (display image) to be displayed. The matrix layer 30 includes, for example, pixel regions 31 (opening, the same applies in the following) and pixel surrounding regions 32 (mask, the same applies in the following) as regions other than the pixel regions 31. The image layer is bonded with the matrix layer 30. Here, "pixel surrounding region 32" refers to a region that is in the surrounding of each pixel region 31 and has a constant transmittance. In addition, the pixel surrounding region 32 shields the light from the side of the first light source group 51, that is, shields the light from the side where the lens array 40 is disposed.

The display part 10 includes multiple pixel regions 31 disposed to include regions in which the light in which the respective light emitted from the position of the first light source group 51 is condensed by the respective lenses 41 of the lens array 40 passes through. In the display part 10, the transmittance of each of the pixel regions 31 is set corresponding to a predetermined stationary pattern.

FIG. 5 is a view illustrating an example of switching display of the display part 10. A view represented by a symbol 200 of FIG. 5 is a display example displayed on the display part (image layer 20), a view represented by a symbol 201 is an example of a displayed pattern, a view represented by a symbol 202 is an enlarged view of a part A of the view represented by the symbol 200, and a view represented by a symbol 203 is an enlarged view of a part B of the view represented by the symbol 202.

In the display example shown in FIG. 5, for example, a display image P1 (Japanese letter "き" in the example), a display image P2 (pattern "Δ" in the example), a display image P3 (capital letter "G" in the example), and a display image P4 (numeral symbol "6" in the example) can be switched and displayed.

As shown in the view of the symbol 203 of FIG. 5, as an example, it is possible to switch the display by partitioning the entire display part 10 into multiple regions (multiple pixels), so that at most four pixel regions 31 are included in one region. In addition, as shown in the view of the symbol 203 of FIG. 5, a region other than the pixel regions 31 of the display part 10 becomes the pixel surrounding region 32.

FIG. 6 is a view illustrating a corresponding relationship among the display part 10, the lenses 41 forming the lens array 40 and the respective light sources 50 forming the first light source group 51. In FIG. 6, two pixels are exemplified, and the light from the respective light sources 50A to 50D of the first light source group are respectively condensed by the lens array and emitted from the corresponding pixel regions 31. Each pixel of the display part 10 is divided into the respective pixel regions 31 and the pixel surrounding region 32. The light sources 50A to 50D shown in FIG. 6 may also be light sources respectively emitting white light, green light, red light, blue light, for example.

By using such display switching device 1, animation display or switchable display can be performed without using a liquid crystal display. Accordingly, a display switching device that is more cost-effective than a liquid crystal display can be realized.

(Regarding Display Directivity)

The directivity of the display images displayed on the display part 10 of the display switching device 1 is described with reference to FIG. 7. FIG. 7 is a view illustrating a position relationship of the first light source group 51 with respect to the display part 10 and the lens array 40. The display switching device 1 can perform display with directivity on the display part 10 by shifting the gravity center position C2 of the first light source group 51 from the center of the display part 10.

As shown in FIG. 7, each light source 50 of the first light source group 51 is disposed on the X2 side with respect to a reference line BL. Here, the reference line BL is the normal direction of a display surface 11 of the display part 10 of the display switching device 1, and is a line passing through the center position of the display part 10. In the embodiment, the reference line BL is a line passing through the gravity center position C1 of the lens array 40 and a main point S1 of the reference lens 41A.

The gravity center position C2 of the first light source group 51 is shifted in X2 direction with respect to the gravity center position C1 of the lens array 40. Here, the gravity center position C2 of the first light source group 51 is a position corresponding to the middle position of a diagonal connecting the light sources 50 located on the outermost sides among the light sources 50. The gravity center position C2 is a hypothetical position. The direction of a line segment L1 connecting the main point S1 of the reference lens 41A of the lens array 40 and the gravity center position C2 of the first light source group 51 is inclined with respect to the reference line BL. In other words, the line segment L1 is inclined with respect to the normal direction of the display surface 11.

The light from each light source 50 of the first light source group 51 is emitted at an angle with respect to the lens array 40. The light of the first light source group 51 condensed by the lens array 40 is inclined at a predetermined angle with respect to the normal direction of the display surface 11 of the display part 10 and emitted to the display part 10. The light emitted from the display part 10 is emitted in a state of being inclined at a predetermined angle with respect to the normal direction of the display surface 11. More specifically, a first averaged oriented direction D1 averaging, among the light sources 50, the oriented directions that are the directions of the directivity of the display of the display part 10, is inclined at a predetermined angle α with respect to the normal direction of the display surface 11. That is, the display in accordance with the first averaged oriented direction D1 is realized by using the light from the first light source group 51. Here, the predetermined angle α may be 10 degrees or more. In addition, the predetermined angle α may be 15 degrees or more.

That is, the display of the display part 10 through the irradiation of the light from the respective light sources 50 of the first light source group 51 exhibits directivity. When viewing in a direction at the predetermined angle with respect to the normal direction of the display surface 11 of the display part 10, that is, viewing in a direction opposite the first averaged oriented direction D1, the user can visually recognize the image displayed on the display part 10. However, when viewing in a direction at an angle other than the predetermined angle with respect to the normal direction of the display surface 11, that is, viewing in a direction other than the direction opposite to the first averaged oriented direction D1, the user cannot visually recognize the image displayed on the display part 10.

According to the display switching device 1, since the display is performed through the light condensed by the respective lenses 41 of the lens array 40, the display using the display part exhibits directivity of a certain extent. In addition, the averaged oriented direction averaging the oriented directions of the display of the display part 10 performed through the irradiation of the light from the respective light sources 50 is inclined at the predetermined angle with respect to the normal direction of the display surface. That is, according to the configuration, display exhibiting directivity in a biased direction that is not the front surface with respect to the display surface 11 of the display part 10 can be realized. At this time, compared with the configuration using light of a specific polarization component, as in the conventional liquid crystal display device, for example, the usage efficiency of the light emitted from the light source can be higher. In addition, the cost can be lower than the liquid crystal display device.

In addition, according to the display switching device 1, by shifting the gravity center position C2 of the first light source group 51 with respect to the gravity center position C1 of the lens array 40, an angle can be set for the incident angle of the light from the first light source group 51 with respect to the lens array 40. Therefore, the direction averaging the directions in which the light of the first light source group 51 condensed by the respective lenses 41 of the lens array 40 passes through can be inclined with respect to the normal direction of the display surface 11 of the display part 10. Accordingly, by disposing the pixel regions 31 of the display part 10 in the regions in which the light of the first light source group 51 condensed by the respective lenses of the lens array passes through, display images having directivity can be displayed on the display part 10.

In addition, according to the display switching device 1, the light usage efficiency is increased. As a result, even if the first averaged oriented direction D1 is inclined by 10 degrees or more with respect to the normal direction of the display surface 11, the visibility of the display in the display part 10 can be increased. In addition, even if the first averaged oriented direction D1 is inclined by 15 degrees or more with respect to the normal direction of the display surface 11, in the vehicle display system 90 included in the shift lever 70 of the automobile, for example, the visibility of the display in the display part 10 can be increased.

3. Modified Example

Although the embodiments of the disclosure have been described above in detail, the above description is merely an example of the disclosure in every respect. It goes without saying that various modifications and variations can be made without departing from the scope of the disclosure. For example, the following changes are possible. In the following, the same symbols are used for components similar to those in the embodiment, and the description is omitted as appropriate for points similar to the embodiment. The following modified examples can be combined as appropriate.

<3.1>

In the display switching device 1 in Embodiment 1, a configuration including only the first light source group 51 is described. However, the display switching device of the disclosure is not limited thereto.

A display switching device 1A according to an aspect of the disclosure is described with reference to FIG. 8 and (a) and (b) of FIG. 9. FIG. 8 is a view illustrating main parts of a configuration of the display switching device 1A according to a modified example of Embodiment 1. In the display switching device 1A, a second light source group 52 formed by multiple light sources 50B is further provided. In FIG. 8 and (a) and (b) of FIG. 9, the light sources 50 forming the first light source group 51 are set as light sources 50A, and the light sources 50 forming the second light source group 52 are set as light sources 50B.

As shown in FIG. 8, the second light source group 52 is arranged at a position different from the first light source group 51. More specifically, the second light source group 52 is disposed at the X1 side with respect to the reference line BL. A gravity center position C3 of the second light source group 52 is shifted in X1 direction with respect to the gravity center position C1 of the lens array 40. The direction of a line segment L2 connecting the main point S1 of the reference lens 41A of the lens array 40 and the gravity center position C3 of the second light source group 52 is inclined with respect to the reference line BL. In other words, the line segment L2 is inclined with respect to the normal direction of the display surface 11. It is noted that the line segment L2 may be inclined with respect to the normal direction of the display surface 11 at an inclined angle same as or different from that of the line segment L1 related to the first light source group 51. In addition, the line segment L2 may be in the same direction as the normal direction of the display surface 11.

The light from each light source 50 of the second light source group 52 is emitted at an angle with respect to the lens array 40. The light of the second light source group 52 condensed by the lens array 40 is inclined at a predetermined angle with respect to the normal direction of the display surface 11 of the display part 10 and emitted to the display part 10. The light of the second light source group 52 emitted from the display part 10 is emitted in a state of being inclined at a predetermined angle with respect to the normal direction of the display surface 11. More specifically, a second averaged oriented direction D2 averaging, among the light sources 50B, the oriented directions that are the directions of the directivity of the display part 10 is inclined at a predetermined angle f3 with respect to the normal direction of the display surface 11. That is, the second averaged oriented direction D2 is realized by using the light from the second light source group 52. The second averaged oriented direction D2 may also be in the same direction as the normal direction of the display surface 11.

According to the configuration, the first averaged oriented direction D1 of the first light source group 51 and the second averaged oriented direction D2 of the second light source group 52 are different directions. Therefore, display exhibiting directivity in two directions can be realized. Accordingly, as shown in (a) and (b) of FIG. 9, display that can be visually recognized at positions of two users can be carried out. In addition, the display switching device 1 in which the first averaged oriented direction D1 according to the light from the first light source group 51 and the second averaged oriented direction D2 according to the light from the second light source group 52 are different can be realized.

(a) and (b) of FIG. 9 are views illustrating relationships between the averaged oriented directions and users able to visually recognize the image in a case where the averaged oriented direction is arranged as two directions different from each other. A symbol 300 in (a) of FIG. 9 represents a diagram illustrating a case where the first light source group 51 and the second light source group 52 are separated in the left-right direction. A symbol 301 in (b) of FIG. 9 represents a diagram illustrating a case where the first light source group 51 and the second light source group 52 are separated in the upper-lower direction. In (a) and (b) of FIG. 9, with respect to the display surface 11 of the display part 10, the description is made by setting X direction as the left-right direction, Y direction as the upper-lower direction, and Z direction as the depth direction.

As indicated with the diagram of the symbol 300 in (a) of FIG. 9, in the case where the first light source group 51 and the second light source group 52 are disposed at different positions in the left-right direction, display that is visible at two different positions for two users present at different positions is carried out. A user U1 present at a position opposite to the first averaged oriented direction D1 cannot visually recognize the display image displayed through the second light source group 52, but can visually recognize the display image displayed through the first light source group 51. Meanwhile, a user U2 present at a position opposite to the second averaged oriented direction D2 cannot visually recognize the display image displayed through the first light source group 51, but can visually recognize the display image displayed through the second light source group 52. According to such configuration, for example, it is possible to reinforce the directivity of display at two positions, which are the user seated position on the driver's side and the user seated position on the passenger's side, for example.

As indicated with the symbol 301 in (b) of FIG. 9, in the case where the first light source group 51 and the second light source group 52 are disposed at different positions in the upper-lower direction, display that is visible at two different positions are possible for one user. For example, in the case where the second averaged oriented direction D2 of the second light source group 52 is set according to an assumed seated position where the user U1 is assumed to be seated in the vehicle, the display image of the display part 10 viewed by the user U1 from the assumed seated position with a normal sight line is the image displayed through the second light source group 52. Meanwhile, when the user U1 moves the sight line downward (Y2 direction) from the normal sight line, since the sight line of the user U1 is opposite to the first averaged oriented direction D1 of the first light source group 51, the user U1 can visually recognize the image displayed by the first light source group 51.

<3.2>

In Embodiment 1, the display directivity in the display part 10 of the display switching device 1 is made possible by shifting the gravity center position C2 of the first light source group 51 from the center of the display part 10. However, the display switching device according to an aspect of the disclosure may be configured to able to perform display exhibiting directivity in the display part 10 by including an optical member that refracts light. The display switching device according to the modified example includes a lens as an optical member 60 that refracts the light emitted from the display surface 11 of the display part 10 in a direction inclined with respect to the normal direction of the display surface 11.

The display switching device according to the modified example is described with reference to (a) to (e) of FIG. 10. (a) to (e) of FIG. 10 are views illustrating display switching devices according to modified examples of Embodiment 1.

A symbol 400 in (a) of FIG. 10 represents a view illustrating main parts of the configuration of a display switching device 1B including a convex lens 61 as the optical member 60. A symbol 401 in (b) of FIG. 10 represents a diagram illustrating the simulation result of the display directivity by using the display part 10 of the display switching device 1B.

As indicated with the view of the symbol 400 in (a) of FIG. 10, the display switching device 1B includes the convex lens 61 that is the optical member 60 on the light emitting side (Z1 side) of the display part 10. The convex lens 61 converges the light of the first light source group 51 emitted from the display part 10.

The display directivity according to the display switching device 1B is described with reference to the simulation result shown in the diagram of the symbol 401 in (b) of FIG. 10. Through observing the light intensity distribution shown on the upper left in the diagram of the symbol 401, it is known that the portion where the light intensity is high in the left-right direction of the diagram is split into two. In the graph indicating light intensity as shown below the diagram of the light intensity distribution of the symbol 401, it is known that there are two peaks at about ±10 degrees.

That is, the display switching device 1B including the convex lens 61 exhibits two averaged oriented directions at about ±10 degrees. The convex lens 61 refracts the light emitted from the display surface 11 in two directions different from each other. Accordingly, it is possible to perform display having directivity in the display part 10 by using the display switching device 1B including the convex lens 61.

A symbol 410 in (c) of FIG. 10 represents a view illustrating main parts of the configuration of a display switching device 1C including a concave lens 62 as the optical member 60. A symbol 411 in (d) of FIG. 10 represents a diagram illustrating the simulation result of the display directivity by using the display part 10 of the display switching device 1C.

As indicated with the diagram of the symbol 410 in (c) of FIG. 10, the display switching device 1C includes the concave lens 62 that is the optical member 60 on the Z1 side of the display part 10. The concave lens 62 diverges the light of the first light source group 51 emitted from the display part 10.

The display directivity according to the display switching device 1C is described with reference to the simulation result shown in the diagram of the symbol 411 in (d) of FIG. 10. Through observing the light intensity distribution shown on the upper left in the diagram of the symbol 411, it is known that the portion where the light intensity is high is split into two in the left-right direction of the diagram. In the graph indicating light intensity as shown below the diagram of the light intensity distribution of the symbol 411, it is known that there are two peaks at about ±15 degrees.

That is, the display switching device 1C including the concave lens 62 exhibits two averaged oriented directions at about ±15 degrees. The concave lens 62 refracts the light emitted from the display surface 11 in two directions different from each other. Accordingly, it is possible to perform display having directivity in the display part 10 by using the display switching device 1C including the concave lens 62.

A symbol 420 in (e) of FIG. 10 represents a view illustrating main parts of the configuration of a display switching device 1D including a lens 63 as the optical member 60. As indicated with the view of the symbol 420, the display switching device 1D may include the lens 63 in which a convex lens and a concave lens are combined as the optical member 60. The lens 63 is provided on the Z1 side of the display part 10.

According to the types of the lenses 61 to 63 of the display switching devices 1B to 1D, the display image displayed on the display part 10 may be scaled up or down. Therefore, by appropriately choosing a convex lens or a concave lens in accordance with the size of the display image displayed on the display part 10, display with variation in image size can be performed. Accordingly, a display switching device capable of performing display that is easy to draw the user's attention can be provided.

The lenses 61 to 63 of the display switching devices 1B to 1D are not limited to the configurations shown in (a) to (e) of FIG. 10. The shapes of the lenses 61 to 63 may also be asymmetric. In the case where the directivity is only reinforced for a specific user, the shapes of the lenses 61 to 63 may be asymmetric. For example, in a case where the display switching devices 1B to 1D are applied to a button on the driver's side of an automobile, it is necessary to arrange the directivity toward the driver seated in front of the button and the passenger seated at the passenger seat. Therefore, the shapes of the lenses 61 to 63 may be left-right asymmetric. In addition, a protection layer for preventing damage or a reflection prevention layer that prevents light reflection may be formed on the surfaces of the lenses 61 to 63 of the display switching devices 1B to 1D.

It is noted that the position where the first light source group 51 is disposed in (a) to (e) of FIG. 10 is not limited to the examples shown in the figure, but can be changed as appropriate in accordance with the averaged oriented direction of display that is set (the same applies to (a) and (b) of FIG. 11). In addition, the lenses 61 to 63 of the display switching devices 1B to 1D may also be provided on the Z2 side of the display part 10. A prism may be incorporated into the lenses 61 to 63 of the display switching devices 1B to 1D, and a member that diffracts light may also be incorporated into the lenses 61 to 63 of the display switching devices 1B to 1D. In addition, the display switching device may also include an optical member that diffracts light in place of the optical member that refracts light.

<3.3>
A display switching device 1E according to an aspect of the disclosure may be configured to able to perform display exhibiting directivity in the display part 10 by including an optical member that refracts light. The display switching device 1E according to the modified example includes a prism as the optical member 60 that refracts the light emitted from the display surface 11 of the display part 10 in a direction inclined with respect to the normal direction of the display surface 11.

The display switching device 1E is described with reference to (a) and (b) of FIG. 11. (a) and (b) of FIG. 11 are views illustrating the display switching device 1E according to a modified example of Embodiment 1. A symbol 500 in (a) of FIG. 11 represents a view illustrating main parts of the configuration of the display switching device 1E including a prism 64 as the optical member 60. A symbol 501 in (a) of FIG. 11 represents a view in which a portion surrounded by a circle in the view of the symbol 500 is enlarged. A symbol 502 in (b) of FIG. 11 represents a diagram illustrating the simulation result of the display directivity by using the display part 10 of the display switching device 1E.

As indicated with the view of the symbol 500 in (a) of FIG. 11, the display switching device 1E includes multiple prisms 64 that are the optical members 60 on the Z1 side of the display part 10. The substrates of the prisms 64 are disposed to be located on the Z2 side. In other words, the substrates of the prisms 64 are disposed to be opposite to the pixel regions 31 of the display part 10.

As indicated with the symbol 501 in (a) of FIG. 11, the light of the first light source group 51 is emitted from the pixel regions 31 of the display part 10 into the substrate of each prism 64. The light emitted into the substrate of each prism 64 is refracted and emitted in the normal direction of the surface 64A and the normal direction of the surface 64B of each prism 64.

The display directivity according to the display switching device 1E is described with reference to the simulation result shown in the diagram of the symbol 502 in (*b*) of FIG. 11. Through observing the light intensity distribution shown on the upper part in the diagram of the symbol 502, it is known that the portion where the light intensity is high is split into two in the left-right direction of the diagram. In the graph indicating light intensity as shown below the diagram of the light intensity distribution of the symbol 502, it is known that there are two peaks at about ±20 degrees.

That is, the display switching device 1E including the prisms 64 exhibits two averaged oriented directions at about ±20 degrees. Each prism 64 refracts the light emitted from the display surface 11 in two directions different from each other. Accordingly, it is possible to perform display having directivity in the display part 10 by using the display switching device 1E including the prisms 64.

In addition, each of the prisms 64 of the display switching device 1E may also be provided on the Z2 side of the display part 10. In addition, the display switching device 1E may also have a configuration including one prism 64. Also, the substrate of the prism 64 may also be located on the Z1 side. In addition, the prism 64 may be in a right-angled triangle shape, and may also be configured as having a surface parallel with the normal direction of the display surface 11 of the display part 10 on the side of Z1. According to such configuration, the display of the display part 10 can exhibit one averaged oriented direction. In addition, the angles of the inclined surfaces of the prism 64 may also be set to be different angles of the inclined surfaces in accordance with the portion of the prism 64 where the light of the first light source group 51 is emitted. According to such configuration, the angle of display directivity is further controlled, and the display image visually recognized by the user can be clearer.

In addition, the prism may also be configured to be incorporated into the lens array 40. According to such configuration, the accumulation of dirt such as dust in the gaps (microstructures) between the prisms 64 can be reduced. In addition, through integral formation, the cost of the display switching device can be reduced.

According to the display switching devices 1B to 1E, the light condensed by the respective lenses 41 of the lens array 40 is refracted and/or diffracted by the optical member 60, so as to be inclined with respect to the normal direction of the display surface 11 of the display part 10. Accordingly, the display switching device having display directivity can be provided by using a simple configuration.

In addition, according to the display switching devices 1B to 1E, a display switching device in which the averaged oriented direction is arranged as two directions different from each other can be provided by using the optical member 60.

4. Application Example

In the embodiments having been described so far, the display switching device of the disclosure is applied to a shift lever. However, the display switching device of the disclosure can also be applied to other driving devices of the vehicle.

For example, the display switching device of the disclosure can be applied to a wiper switch controlling the operation mode of a wiper.

In addition, the display switching device of the disclosure can also be applied to a dial-type system selecting the operation mode of a transmission.

In addition, the display switching device of the disclosure can be applied to a switch (also referred to as a steering switch) provided on a steering wheel.

In addition, the display switching device of the disclosure can also be applied in an operation panel for the back seat. Such operation panel may be, for example, capable of controlling the air conditioning of the vehicle and selecting the audio operation. Accordingly, the passenger at the back seat can control some of the driving devices of the vehicle.

In addition, the display switching device of the disclosure can be applied to a so-called push start switch that controls ON/OFF of the power of the engine. In such case, the color of the image displayed in the case where the power of the engine is OFF and the driver applies brakes of the vehicle and the case where the power of the engine is OFF and the driver does not apply brakes of the vehicle may be changed.

In addition, the display switching device of the disclosure can be applied to an instrument panel. For example, the display switching device of the disclosure may be applied to a turn signal or alert display displayed on the instrument panel.

In addition, the display switching device of the disclosure can be applied to a light switch that controls the operation of the headlight of the vehicle.

In addition, the display switching device of the disclosure can be applied to a heater control switch that controls the operation of a heater of the vehicle.

In addition, the display switching device of the disclosure can be applied to a welfare vehicle. Here, as a welfare vehicle, a welfare vehicle transporting a wheelchair in which a person sits is known. In such welfare vehicle, various switches are present, such as a switch for moving the wheelchair into the vehicle, such as a height adjustment switch, a safety belt switch, a fixing device for fixing the wheelchair. In addition, depending on the switches, multiple operations, such as "pull", "push", and "long press", are required. Therefore, there is an issue that it is difficult to verify how to operate each switch of the welfare vehicle. By applying the display switching device of the disclosure to each switch of such welfare vehicle, it becomes easier for the operator of the welfare vehicle to recognize which mode is the currently selected mode, and the concern of generating an erroneous operation can be alleviated.

In addition, the display switching device of the disclosure is not limited to being applied to a vehicle-related device. The display switching device of the disclosure may also be applied to a device or a system which is a device or a system provided in a scenario other than a vehicle and has the needs to perform display with directivity.

In the application examples of the display switching device, in the case where the display switching device is applied as a switch, by providing a dent at the central portion of the display switching device, the touchability of the user can be facilitated, while the display has directivity.

In the application examples of the display switching device, in the case where the display switching device is applied to a grip portion, such as a shift lever, by making the display surface side of the display switching device a convex shape, the grip portion can become easier to grip. Accordingly, the operability can be facilitated, while the display has directivity.

The disclosure is not limited to the above-described embodiments, and various modifications are possible within the scope of the claims. Embodiments obtained by appropriately combining technical means disclosed in different embodiments are also included in the technical scope of the disclosure.

[Outline]

A display switching device according to Aspect 1 of the disclosure switches display images by switching irradiation of light from a plurality of light sources. The display switching device includes: a lens array, in which a plurality of lenses are arranged; and a display part, including a plurality of pixel regions disposed to include regions in which light in which the respective light emitted from the light sources is condensed by the respective lenses of the lens array passes through. A transmittance of each of the pixel regions is set corresponding to a predetermined stationary pattern, and display of the display part performed through the irradiation of the light of the light sources exhibits directivity, and an averaged oriented direction averaging, among the light sources, oriented directions that are directions of the directivity is inclined at a predetermined angle with respect to a normal direction of a display surface of the display part.

According to a display switching device of Aspect 2 of the disclosure, in Aspect 1, it may also be that the lens located at a closest position with respect to a gravity center of the lens array is set as a reference lens, and a direction of a line segment connecting a main point of the reference lens and a gravity center position of a first light source group formed by a plurality of light sources of the light sources is inclined with respect to the normal direction of the display surface.

According to a display switching device of Aspect 3 of the disclosure, in Aspect 1 or 2, it may also be that the display switching device further includes an optical member having a function of refracting light emitted from the display surface in a direction inclined with respect to the normal direction of the display surface, diffracting the light emitted from the display surface in the direction inclined with respect to the normal direction of the display surface, or combining the refracting and the diffracting.

According to a display switching device of Aspect 4 of the disclosure, in Aspect 3, it may also be that the optical member is a lens.

According to a display switching device of Aspect 5 of the disclosure, in Aspect 3, it may also be that the optical member is a prism.

According to a display switching device of Aspect 6 of the disclosure, in any one of Aspects 1 to 5, it may also be that the averaged oriented direction is arranged as two directions different from each other.

According to a display switching device of Aspect 7 of the disclosure, in Aspect 6, it may also be that display in accordance with a first averaged oriented direction is realized through light from a first light source group formed by a plurality of light sources of the light sources, and a second averaged oriented direction is realized through light from a second light source group formed by a plurality of light sources of the light sources and disposed at a position different from that of the first light source group.

According to a display switching device of Aspect 8 of the disclosure, in Aspect 6 or 7, it may also be that the display switching device further includes an optical member having a function of refracting the light emitted from the display surface in two directions different from each other, diffracting the light emitted from the display surface in two directions different from each other, or combining the refracting and the diffracting.

A vehicle display system according to Aspect 9 of the disclosure is configured to include the display switching device according to any one of Aspects 1 to 8, and the display switching device is provided in a state in which the averaged oriented direction is oriented toward an assumed seated position where a passenger is assumed to be seated in a vehicle.

According to a vehicle display system of Aspect 10 of the disclosure, in Aspect 9, it may also be that the display switching device is provided in a shift lever provided in the vehicle.

An automobile according to Aspect 11 of the disclosure is configured to be provided with the vehicle display system according to Aspect 9 or 10.

What is claimed is:

1. A display switching device, switching display images by switching irradiation of light from a plurality of light sources, the display switching device comprising:
    a lens array, in which a plurality of lenses are arranged; and
    a display part, comprising a plurality of pixel regions disposed to comprise regions in which light in which the respective light emitted from the light sources is condensed by the respective lenses of the lens array passes through,
        wherein a transmittance of each of the pixel regions is set corresponding to a predetermined stationary pattern, and
        display of the display part performed through the irradiation of the light of the light sources exhibits directivity, and an averaged oriented direction averaging, among the light sources, oriented directions that are directions of the directivity is inclined at a predetermined angle with respect to a normal direction of a display surface of the display part,
        wherein the lens located at a closest position with respect to a gravity center of the lens array is set as a reference lens, and
        a direction of a line segment connecting a main point of the reference lens and a gravity center position of a first light source group formed by a plurality of light sources of the light sources is inclined with respect to the normal direction of the display surface.

2. The display switching device as claimed in claim 1, further comprising an optical member having a function of refracting light emitted from the display surface in a direction inclined with respect to the normal direction of the display surface, diffracting the light emitted from the display surface in the direction inclined with respect to the normal direction of the display surface, or combining the refracting and the diffracting.

3. The display switching device as claimed in claim 2, wherein the optical member is a lens.

4. The display switching device as claimed in claim 2, wherein the optical member is a prism.

5. A vehicle display system, comprising the display switching device as claimed in claim 1,
    wherein the display switching device is provided in a state in which the averaged oriented direction is oriented toward an assumed seated position where a passenger is assumed to be seated in a vehicle.

6. The vehicle display system as claimed in claim 5, wherein the display switching device is provided in a shift lever provided in the vehicle.

7. An automobile, provided with the vehicle display system as claimed in claim 5.

8. A display switching device, switching display images by switching irradiation of light from a plurality of light sources, the display switching device comprising:

a lens array, in which a plurality of lenses are arranged; and a display part, comprising a plurality of pixel regions disposed to comprise regions in which light in which the respective light emitted from the light sources is condensed by the respective lenses of the lens array passes through, wherein a transmittance of each of the pixel regions is set corresponding to a predetermined stationary pattern, and display of the display part performed through the irradiation of the light of the light sources exhibits directivity, and an averaged oriented direction averaging, among the light sources, oriented directions that are directions of the directivity is inclined at a predetermined angle with respect to a normal direction of a display surface of the display part, wherein the averaged oriented direction is arranged as two directions different from each other, wherein display in accordance with a first averaged oriented direction is realized through light from a first light source group formed by a plurality of light sources of the light sources, and a second averaged oriented direction is realized through light from a second light source group formed by a plurality of light sources of the light sources and disposed at a position different from that of the first light source group.

9. The display switching device as claimed in claim 8, further comprising an optical member having a function of refracting the light emitted from the display surface in two directions different from each other, diffracting the light emitted from the display surface in two directions different from each other, or combining the refracting and the diffracting.

* * * * *